United States Patent [19]

Schulz et al.

[11] Patent Number: 4,676,648
[45] Date of Patent: Jun. 30, 1987

[54] METHOD AND APPARATUS FOR NON-CONTACT DETERMINATION OF RUN-OUT OF A ROTATING BODY

[75] Inventors: Wolfgang Schulz, Mettmann; Günther Himmler, Darmstadt; Günter Knoll, Büttelborn; Friedrich Wenz, Seeheim-Jugenheim, all of Fed. Rep. of Germany

[73] Assignees: Gebr.Hofmann GmbH & Co KG Maschinenfabrik, Pfungstadt; Dr.-Ing.Wolfgang Schulz Messtechnik, Mettmann, both of Fed. Rep. of Germany

[21] Appl. No.: 654,494

[22] Filed: Sep. 26, 1984

[30] Foreign Application Priority Data

Sep. 27, 1983 [DE] Fed. Rep. of Germany ....... 3334976

[51] Int. Cl.$^4$ .............................................. G01B 11/10
[52] U.S. Cl. .................................... 356/385; 356/386; 356/426; 350/584
[58] Field of Search ............................... 356/384–387, 356/426, 237; 350/584; 250/222.1, 224, 571, 572

[56] References Cited

U.S. PATENT DOCUMENTS

| 3,398,023 | 8/1968 | Jacobsen et al. | 350/584 X |
| 3,604,940 | 9/1971 | Matthews | 356/426 X |
| 3,826,576 | 7/1974 | Stewart | 356/384 X |
| 4,021,119 | 5/1977 | Stauffer | 356/386 |

FOREIGN PATENT DOCUMENTS 2718807 11/1977 Fed. Rep. of Germany .
2818789 11/1979 Fed. Rep. of Germany .

Primary Examiner—F. L. Evans
Attorney, Agent, or Firm—Fleit, Jacobson, Cohn & Price

[57] ABSTRACT

A method and an apparatus for determination of run-out of a rotating body, especially an automobile tire, without the need for mechanically contacting the rotating body. The apparatus includes a device for rotating the body, a scanning system with a transmitter for transmitting parallel rays directed toward the rotating body, a receiver to receive the residual rays not blocked by the rotating body, and an analyzer circuit for determination of variations in blockage on the basis of which run-out of the rotating body is determined.

14 Claims, 7 Drawing Figures

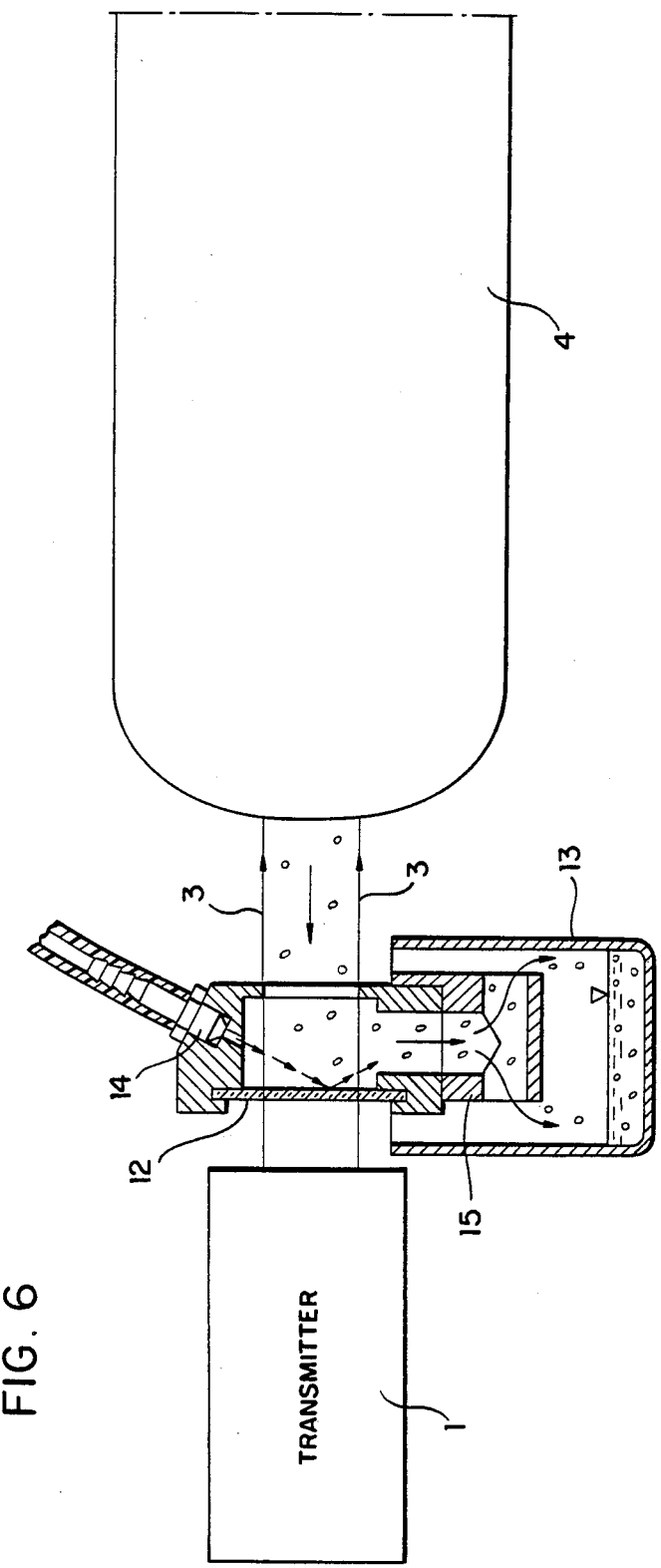
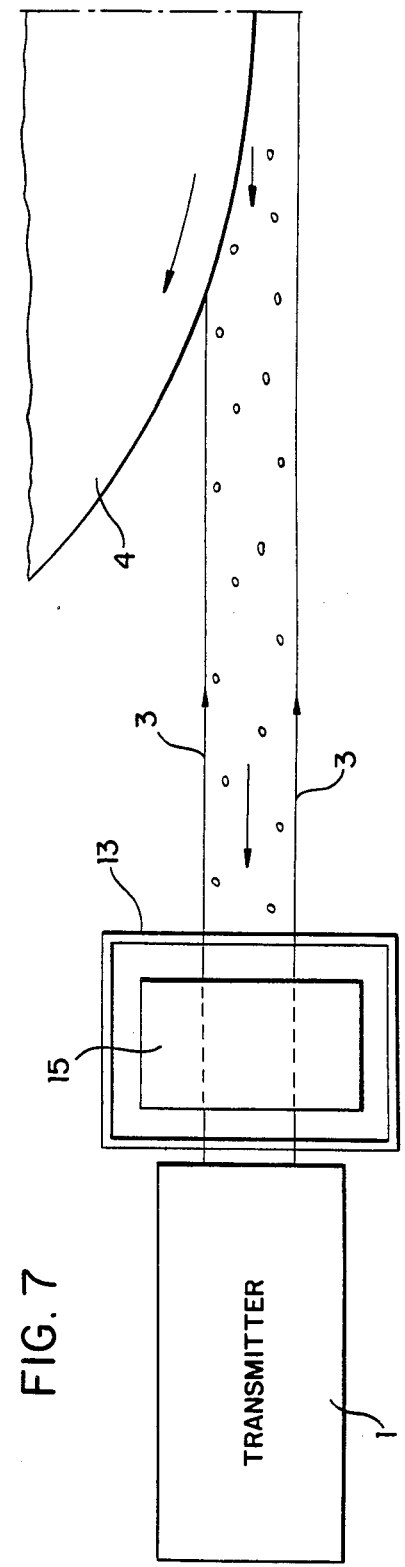

4,676,648

METHOD AND APPARATUS FOR NON-CONTACT DETERMINATION OF RUN-OUT OF A ROTATING BODY

BACKGROUND OF THE INVENTION

1. Field of the Invention

The invention relates to a method and apparatus for non-contact determination of run-out of a rotating body, and more particularly to an optical method and apparatus for determining the run-out of a rotating body, especially an automobile tire.

2. Description of Related Art

Heretofore known methods and apparatus to determine run-out, in particular radial run-out, of rotating bodies, e.g., automobile tires, has been accomplished by means of rollers applied against the tire and displacement transducers connected to the rollers. The mechanical radial run-out detected is transformed, e.g., by means of inductive displacement transducers, into a proportional electrical signal. That approach to run-out determination and measurement requires mechanical contact of the roller with the tire.

On the other hand, it is known to determine run-out of rubber-coated paper rolls via a reflection measuring technique. For that purpose the rubber-coated surface of the paper roll is exposed to radiation that emanates from a suitable radiation source and the radiation that is reflected by the rubber-coated surface is received and measured in a receiver. With rotating bodies that have circumferential surfaces that are grooved, or otherwise have an intentional surface roughness, such as, for example, automobile tires, it is possible to ascertain the quality of the sidewalls by using the reflection technique, but similar determination of radial run-out of such rotating bodies is difficult, particularly if the groove depth is larger than the radial run-out. With automobile tires the tread groove depth is about 8 mm and radial run-out is generally about 0.2 mm. Consequently the interfering signal obtained as a result of the grooves, or the surface roughness, would mask the run-out signal.

SUMMARY OF THE INVENTION

It is an object of the present invention to provide a method and apparatus for non-contact determination of run-out of a rotating body and that can be used with externally grooved rotating bodies, especially automobile tires, with any interference signal produced by the tire tread grooves being an unimportant portion of the total run-out signal.

The present method and apparatus are directed to non-contact measurement of run-out of a rotating body, particularly the radial run-out of an automobile tire. The measuring system is relatively remote from the object under test and is largely unaffected by interference signals. In contrast with the known reflection technique, where the distance relative to the surface under test is measured, measurement in accordance with the present invention is tangential to the surface for which the run-out characteristics are to be studied.

It is known to measure the dimensions of an object by shading an optical beam of rays by means of the object, which is placed in the beam of rays (see, for example, German patent applications DE-PS No. 27 18 807 and DE-OS No. 28 18 789), but that measurement method is carried out with the object stationary and with the whole object exposed to radiation, i.e., the object is exposed to a great extent to radiation, the direction of which differs from the tangential direction, and furthermore the size of the object under test is limited by the size of the measuring equipment, as the object cannot be larger than the parallel beam of the radiation rays produced by the equipment.

The present method and apparatus differ from the shading technique in that a parallel beam of rays is directed tangentially to the surface of the rotating body for which the run-out is to be determined. It is only necessary that the surface of the rotating body be brought into the path of the rays, and it is not necessary to expose the entire rotating body to the beam of rays, such as is disclosed in German patent applications DE-PS No. 27 18 807 and DE-OS No. 28 18 789, where the dimensions of a stationary object are measured. Hence it is possible with the method and apparatus of the present invention to measure run-out of rotating bodies having grooves or rough surfaces.

For improved measurement, the parallel beam of rays is preferably directed in a perpendicular direction relative to the axis of rotation of the rotating body. Furthermore, the shading is preferably measured within certain scanning width limits.

In order to ensure measurement at relatively low radiated power unaffected by outside light, the light source of the radiation transmitter is preferably driven by current pulses, or alternating current modulated at a given frequency. The shaded radiation received in the receiver is then analyzed selectively in consideration of the frequency of the radiation transmitted.

For analysis of the radiation received in the receiver, the temperature of the components used for analysis, especially that of the semi-conductor elements, and the age of the radiation source in the radiation transmitter play an important part. If the transmitting power of the radiation source is controlled by a reference circuit, such as is used with the known techniques and apparatus, inaccuracies would be unavoidable. For this reason it is preferable to control the transmitting power of the radiation source provided inside the transmitter by means of current delivered from the receiver so that the transmitting power remains constant in the intervals between successive measurements. This control of transmitting power of the radiation source can be stopped during the actual measurement, i.e., when the rotating body is in the path of the parallel rays. With this technique it can be ensured that drift resulting from temperature or age of the components, in particular the semi-conductor elements in the receiver and in the analyzer circuit, as well as contamination of the optical transmitter and receiver components, does not produce errors in measurement.

In order to remove airborne particles which might get into the path of the rays transmitted during rotation of the body, it has proved advantageous to provide for a current of air across the path of the rays transmitted so that the airborne particles, in particular humidity and dirt particles, are eliminated from the path of the rays. Especially when automobile tires are measured, water particles left after the tire soaping process, or rubber particles that stick to the tire after curing, might loosen during rotation. Such particles in the path of the rays would adversely affect measurement.

Furthermore, it is possible to provide for a protective screen allowing free transmission of radiation, but protecting the optical elements from foreign matter; this screen is provided in front of the optical element of the transmitter. It is then of advantage to direct the current of air at an angle of greater than 0 deg., in particular about 20 deg., toward this protective screen. The current of air can be so arranged and readjusted that the rotating body under test is not set into vibrations. At the same time the air will clean the protective screen.

BRIEF DESCRIPTION OF THE DRAWINGS

The preferred embodiment is illustrated in the accompanying drawings, in which:

FIG. 6 is a top view of another preferred embodiment in which a current of air is directed into the beam of rays sent out by the transmitter; and FIG. 7 is a side elevational view of the preferred embodiment illustrated in FIG. 6.

DESCRIPTION OF THE PREFERRED EMBODIMENTS

Figure 1:
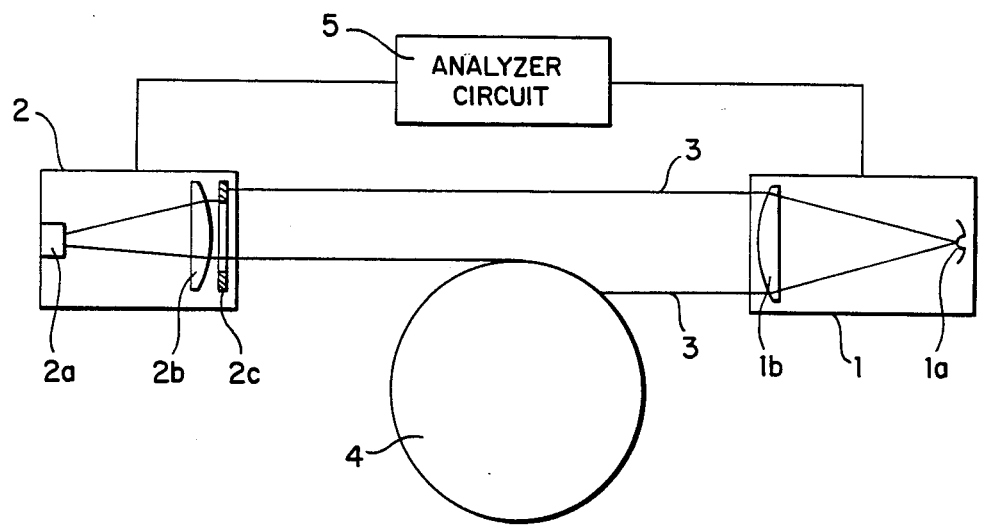
FIG. 1 is a schematic representation of a preferred embodiment using a light source in a transmitter to send out a largely diverging beam of rays which is then set parallel by means of the optical transmitter element.

The preferred embodiment illustrated in FIG. 1 includes a transmitter 1 with a radiation source 1a which has a small radiating surface. The radiation source, for example an infrared emitting diode, transmits largely diverging rays of radiation. Source 1a is positioned at the focus of a collimating converging lens 1b, the focal length of which is about 100 to 500 times the diameter of the radiating surface of the radiation source 1a. The power of the radiation transmitted through the lens 1b is sufficient for measurement. The beam of rays 3 that passes from the lens 1b is made up of rays that are substantially parallel. The rotating body 4, which is to be tested for radial run-out, is positioned so that its outer surface is partially in the path of the beam of parallel rays 3, and the axis of the rotating body 4 is perpendicular to the direction of the beam of parallel rays 3. Furthermore, the beam of rays 3 is tangential to the outer surface of the rotating body 4 that is to be tested for run-out. In the illustrated embodiment, that surface is the periphery of the rotating body 4, for example the tread of an automobile tire having grooves in the tread.

A receiver 2, which receives the beam of rays 3 that is partly shaded by the rotating body 4, is provided at a distance of, say, 1 meter from transmitter 1 and on the opposite side of the rotating body from transmitter 1. The receiver 2 includes a diaphragm 2c for limiting the size of the beam of rays 3 that is received, with the width of the diaphragm 2c being adjustable to the desired scanning width. Furthermore, the receiver 2 includes an optical element 2b, which can be a lens, by which the parallel beam that passes through the diaphragm 2c is made to converge on a detector, such as a photoelectric detector 2a. Photoelectric detector 2a supplies electric current as a function of the quantity of the light it receives.

An analyzer circuit 5 is connected to detector 2a and determines the changes in the shading, or in the quantity of light received by detector 2a, as a result of radial run-out of the rotating body 4 on the basis of the current signals supplied by the detector 2a and provides a suitable readout indicative of the radial run-out.

In order to prevent outside light from adversely affecting the measurement, the radiation source 1a is driven with current pulses and consequently delivers relative radiation pulses, in particular light pulses. The analyzer circuit 5 connected to the detector 2a includes a band-pass filter tuned to the frequency of the light pulses, thus achieving selective analysis of the signals received from detector 2a, and suppressing the influence of light from sources other than source 1a. With this technique it is possible for the analyzer circuit 5 to determine unambiguously any changes in the shading, or in the quantity of light received by detector 2a, caused by the rotating body 4 on the basis of the current supplied by the detector 2a. Radial run-out of the rotating body 4 is then determined on the basis of the variations in shading or in the quantity of light received by detector 2a, during rotation of the body 4.

The output current supplied by the detector 2a depends on the radiated light received, the temperature, the behavior under temperature of the various components, in particular the semi-conductor elements, and the age of the components, in particular of the radiation source 1a. In order to eliminate those influences, the current supplied by detector 2a is preferably controlled to a constant given value by means of the analyzer circuit 5 and by using the current supplied the radiation source 1a during the intervals between successive measurements, i.e., when no rotating body 4 is in the path of rays 3. During measurement this control function is cut out. Hence it is ensured that drift as a result of the temperature or age of the components, in particular of the semi-conductor elements, or contamination of the lenses and optical elements in the transmitter and receiver do not adversely affect the accuracy of measurement.

Figure 2:
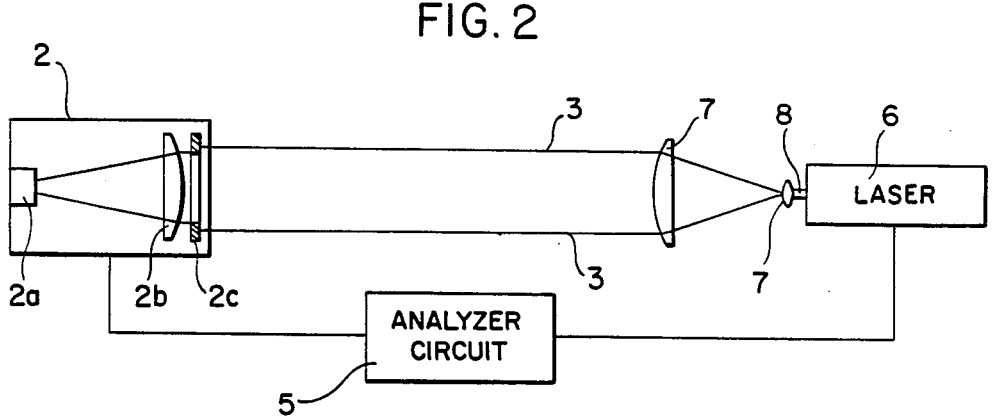
FIG. 2 is a preferred embodiment in which the light source is a laser, the rays of which initially diverge and then are set parallel.
Figure 3:
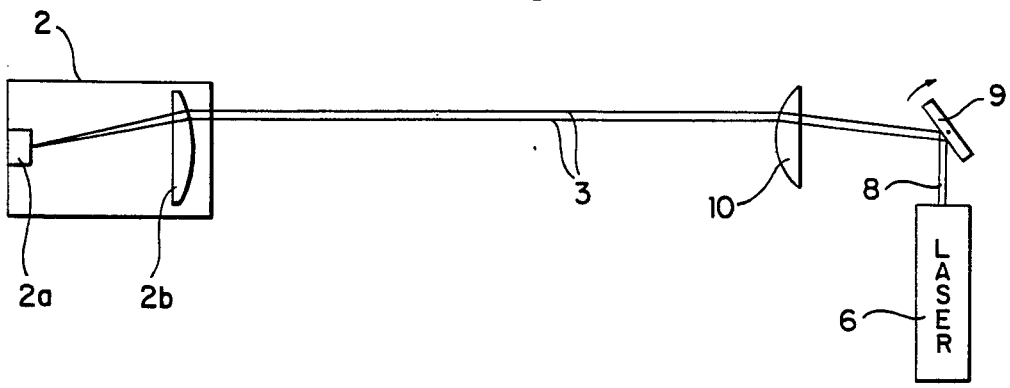
FIG. 3 is a preferred embodiment in which the light source is a laser, the beam of which is deflected by means of a parallel deflector in the measuring plane of the receiver.

The infrared emitting diode serving as the radiation source 1a can be replaced by a laser 6 as illustrated in FIGS. 2 and 3. With the preferred embodiment illustrated in FIG. 2, the laser beam 8 sent out by the laser 6 is enlarged to a larger beam diameter and first caused to diverge by the telescopic optical system 7 and then is transformed into a beam of substantially parallel rays having the desired diameter. The analysis method is the same as that described in connection with the embodiment of FIG. 1, i.e., by means of a receiver 2 and an analyzer circuit 5 connected to a detector, in particular a photoelectric detector 2a. In addition to infrared and laser light sources, a visible light source can also be used.

In the preferred embodiment illustrated in FIG. 3, the laser beam 8 of the laser 6 is deflected by means of a rotary mirror 9, the axis of rotation of which lies on the principal axis of a cylindrical lens 10. The deflected laser beam is parallel to and displaced relative to the measuring plane, i.e., in a plane perpendicular to the rotor axis. This parallel displacement is performed at least during analysis and determination of variations in shading caused by the rotating body.

Figure 4:
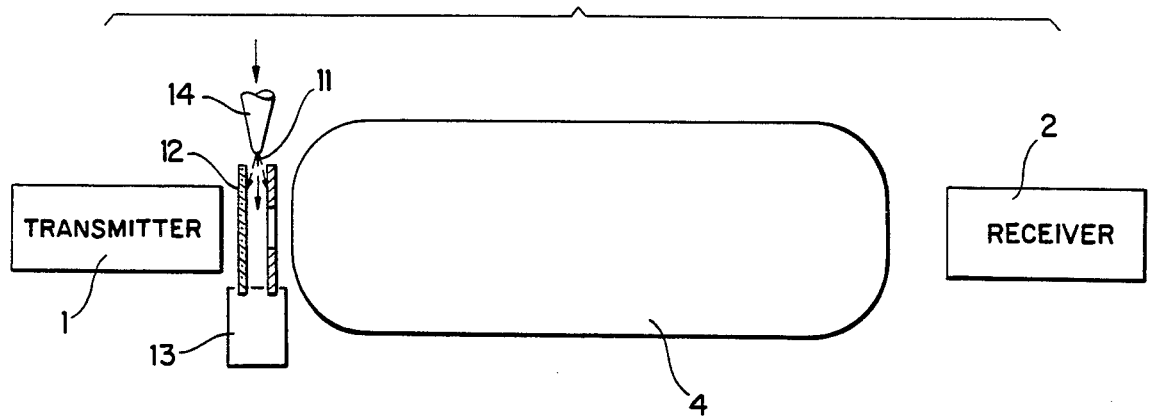
FIG. 4 is a top view of a preferred embodiment in which a current of air is directed across the beam of rays sent out from the transmitter.
Figure 5:
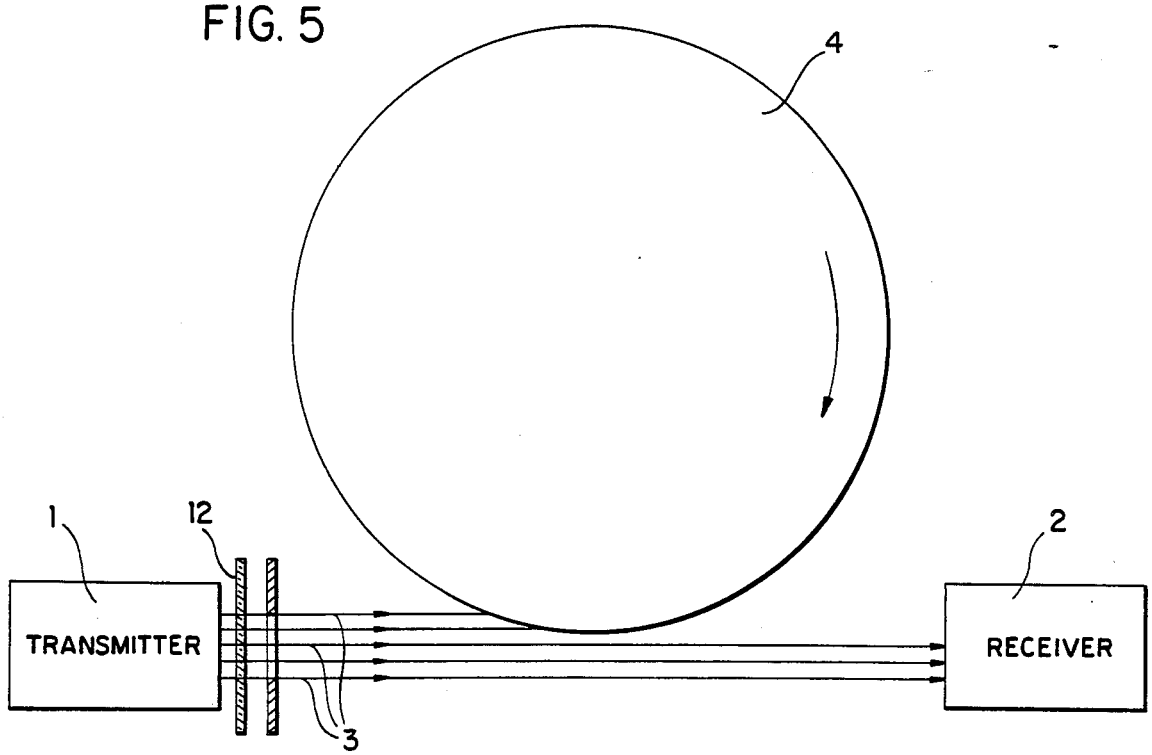
FIG. 5 is a side elevational view of the preferred embodiment illustrated in FIG. 4.

FIGS. 4 and 5 show a preferred embodiment where a current of air 11 is directed toward the beam of rays transmitted by the transmitter 1. The current of air 11 is directed substantially perpendicular to the direction of the beam and emanates from the nozzle 14. Particulate foreign matter, such as for example humidity or dirt particles, or with automobile tires, water particles left after the soaping process or rubber particles that stick to the tire after curing, is blown out of the path of rays 3 and collected in the tray 13. Furthermore, a protective screen 12, allowing free transmission of radiation, is placed in front of the optical transmitter 1 in order to protect the transmitter and its optical element against deposit thereon of any particles loosened from the rotating body. The direction of rotation of the body 4 is such that the periphery of the body moves toward the transmitter 1 as can be seen in FIG. 5.

As can be seen from the preferred embodiment illustrated in FIGS. 6 and 7, a current of air is blown by nozzle 14 at a certain angle into the beam 3. This angle is preferably such that the current of air impinges on the protective screen 12 at an angle of about 20 deg., relative to a plane perpendicular to the beam of rays 3, thus protecting the screen 12 against contamination by particulate matter. FIG. 6 shows that screen 12 is held in a frame 15. Furthermore, tray 13 is provided to collect all particles blown from the beam 3. If, despite the use of a cleaning air current, the protective screen 12 is contaminated beyond a given level of contamination, an alarm can be given so that the screen, which can be made of glass, is either replaced or is cleaned by some suitable means.

In operation, and as illustrated in FIG. 1, a rotating body 4, such as an automobile tire, is mounted for rotation about an axis. A beam of light is positioned perpendicular to the axis of rotation of the tire to pass tangentially of the outer circumferential surface of the tire as the latter rotates. A suitable receiver 2 is positioned in line with the light beam and on the opposite side of the rotating tire. Part of the light beam impinges on the circumferential surface of the tire and the remainder passes beyond the rotating tire and is intercepted by the receiver. The variation in the amount of light intercepted by the receiver as the tire rotates is related to the radial run-out of the tire and can be analyzed and displayed by a suitable circuit 5 to permit quality grading of the tire based upon the degree of radial run-out.

The above-described preferred embodiments illustrate details of determination of radial run-out of a rotating body, but the principle of this measurement of shading can be used for measurement of lateral run-out of a rotating body as well.

Although particular embodiments of the invention have been illustrated and described, it will be apparent to those skilled in the art that various changes and modifications can be made without departing from the spirit of the present invention, and it is intended to encompass within the appended claims all such changes and modifications that fall within the scope of the present invention.

What is claimed is:

1. A method for determining the run-out of a rotating body, said method comprising:
   (a) providing a laser light source having a laser beam output;
   (b) enlarging the laser beam from a first diameter beam of parallel rays to a second, larger diameter beam of parallel rays;
   (c) positioning a receiver to receive the second beam;
   (d) partially interposing into the second beam between the transmitter and the receiver a body for which the run-out is to be determined so that the periphery of the body extends into and blocks a part of the rays of the second beam;
   (e) rotating said body about an axis of rotation with the second beam oriented so that it is tangential to the periphery of the rotating body so that part of the rays are blocked by the rotating body;
   (f) detecting the beam strength at the receiver as the body is rotating; and
   (g) providing an output indicative of run-out of the rotating body based upon the variation of the beam strength detected by the receiver as the body is rotating.

2. A method for determining the run-out of a rotating body, said method comprising:
   (a) providing a beam of parallel light rays from a laser light source;
   (b) positioning a receiver to receive the beam;
   (c) partially interposing into the beam between the laser light source and the receiver a body for which the run-out is to be determined so that the periphery of the body extends into and blocks a part of the rays of the beam;
   (d) shifting the parallel light rays from the laser beam in a direction parallel to the original beam direction for the time of determination of the run-out;
   (e) rotating said body about an axis of rotation with the beam oriented so that it is tangential to the periphery of the rotating body so that part of the rays are blocked by the rotating body;
   (f) detecting the beam strength at the receiver as the body is rotating; and
   (g) providing an output indicative of run-out of the rotating body based upon the variation of the beam strength detected by the receiver as the body is rotating.

3. An apparatus for determination of run-out of a rotating body, said apparatus comprising:
   a scanning device with a transmitter for sending out radiation toward the rotating body; a receiver for the radiation passing the rotating body, wherein the transmitter sends out a beam of parallel rays, with the rotating body having its periphery in the path of the parallel rays, the beam of parallel rays being tangential to the periphery of the rotating body, and the receiver receives the beam of parallel rays partly blocked by the rotating body; and an analyzer means connected to the receiver to determine that variation in blockage of the beam by the rotating body and producing an output signal, wherein the analyzer means includes control means for controlling the transmitting power of the radiation source by means of the current supplied by the receiver so that the transmitting power is held constant in the intervals between successive measurements.

4. An apparatus according to claim 3, wherein the control means includes means for stopping control of the transmitting power of the radiation source when the rotating body is in the path of the rays.

5. An apparatus according to claim 3 in which the direction of rotation of body is such that the surface of the body moves toward the transmitter.

6. An apparatus according to claim 3 in which the beam of parallel rays is tangential to the surface under test of the rotating body.

7. An apparatus according to claim 3 in which the beam of parallel rays is directed toward the circumferential surface of the rotating body.

8. An apparatus according to claim 3 in which the beam of parallel rays is directed toward the lateral surfaces of the rotating body.

9. An apparatus for determination of run-out of a rotating body, said apparatus comprising:
a scanning device with a transmitter for sending out radiation directed toward the rotating body; a receiver for the radiation passing the rotating body, wherein the transmitter sends out a beam of parallel rays, with the rotating body having its periphery in the path of the parallel rays, the beam of parallel rays being tangential to the periphery of the rotating body, and the receiver receives the beam of parallel rays partly blocked by the rotating body; an analyzer means connected to the receiver to determine that variation in blockage of the beam by the rotating body and producing an output signal; and deflection means for deflecting the beam in a measuring plane in a direction parallel to the original direction of the beam.

10. An apparatus for determination of run-out of a rotating body, said apparatus comprising:
a scanning device with a transmitter for sending out radiation directed toward the rotating body; a receiver for the radiation passing the rotating body, wherein the transmitter sends out a beam of parallel rays, with the rotating body having its periphery in the path of the parallel rays, the beam of parallel rays being tangential to the periphery of the rotating body, and the receiver receives the beam of parallel rays partly blocked by the rotating body; an analyzer means connected to the receiver to determine that variation in blockage of the beam by the rotating body and producing an output signal; and means to provide a current of air directed across the path of the rays toward the rotating body for blowing particulate foreign matter out of the path of the rays.

11. An apparatus according to claim 10 in which the current of air is perpendicular to the path of rays and protects the transmitter.

12. An apparatus according to claim 10, including a protective screen positioned between the receiver and the rotating body, and air current means for directing a current of air at an acute angle relative to the surface of the protective screen to allow free transmission of radiation.

13. An apparatus according to claim 12 in which the acute angle between the protective screen and the current of air is about 20 degrees.

14. An apparatus according to claim 10 in which a tray is provided for collecting foreign matter blown from the beam of rays by the current of air.

* * * * *